INVENTOR
GEORGE H. SHERER
BY Cushman, Darby & Cushman
ATTORNEYS

INVENTOR
GEORGE H. SHERER

BY Cushman, Darby & Cushman
ATTORNEYS

INVENTOR
GEORGE H. SHERER

BY Cushman, Darby & Cushman
ATTORNEYS

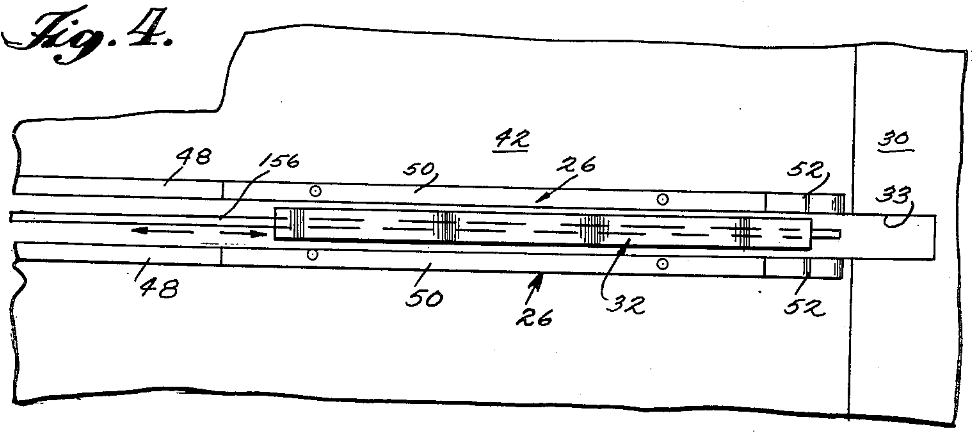
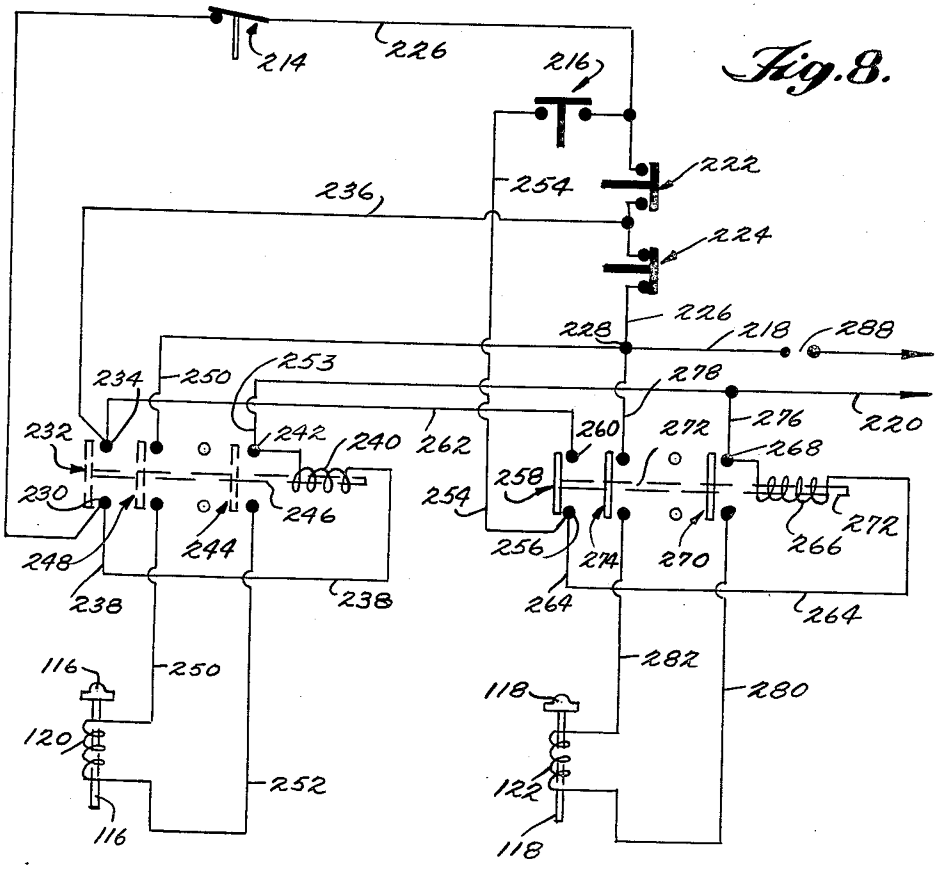
INVENTOR
GEORGE H. SHERER
BY Cushman, Darby & Cushman
ATTORNEYS Feb. 26, 1963 G. H. SHERER 3,078,994
APPARATUS AND METHOD FOR TESTING THE DENSITY OF YARN PACKAGES AND FOR SORTING SAME
Filed Aug. 31, 1960
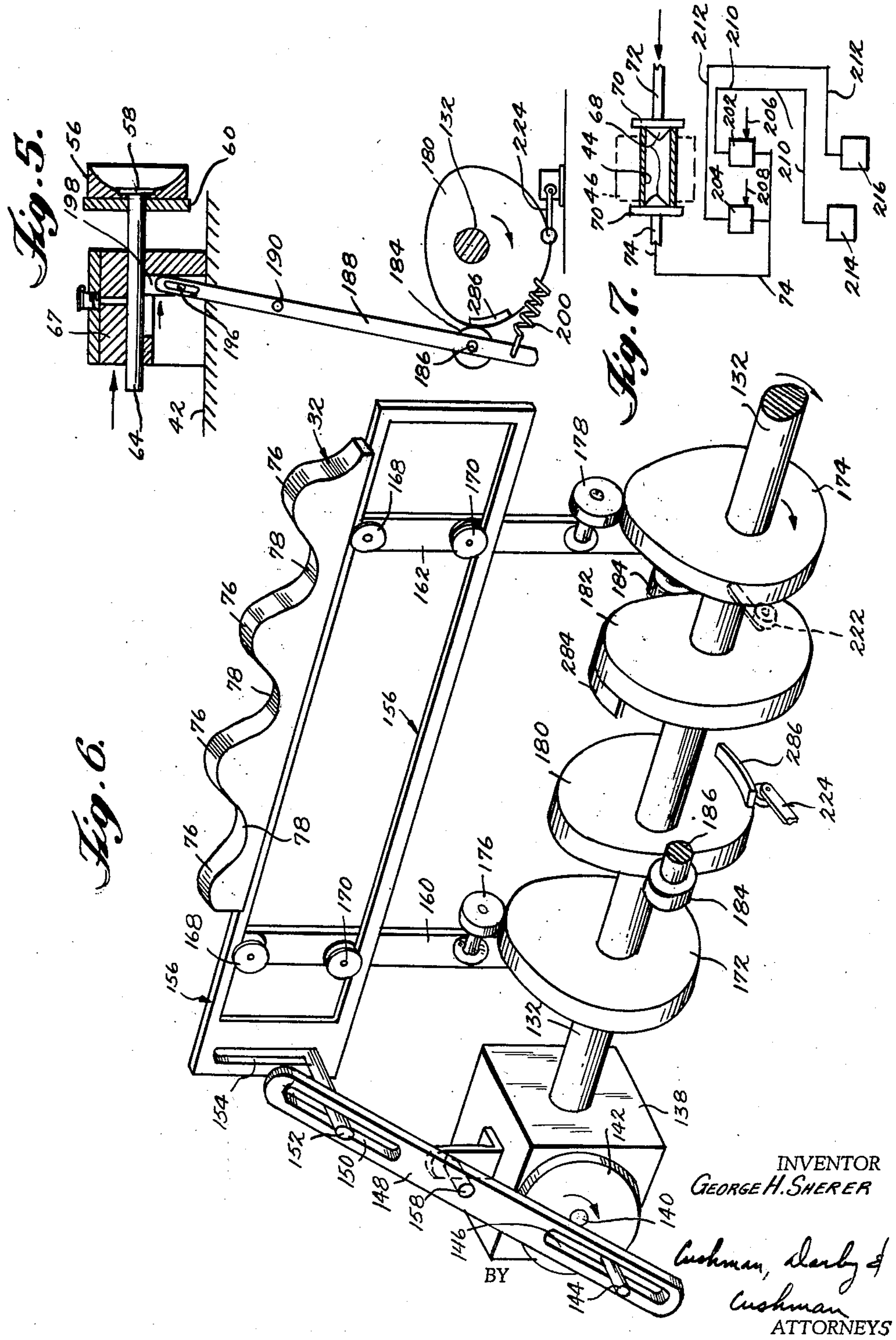
INVENTOR
GEORGE H. SHERER
BY Cushman, Darby & Cushman
ATTORNEYS 3,078,994
Patented Feb. 26, 1963

3,078,994

APPARATUS AND METHOD FOR TESTING THE DENSITY OF YARN PACKAGES AND FOR SORTING SAME

George H. Sherer, West Cramerton, N.C., assignor to Burlington Industries, Inc., Greensboro, N.C., a corporation of Delaware Filed Aug. 31, 1960, Ser. No. 53,264
14 Claims. (Cl. 209—72)

The present invention relates to an apparatus and method for measuring or testing the density or relative permeability of yarn masses in yarn packages. The invention also relates to an apparatus or method for sorting or separating yarn packages according to the density or relative permeability of the yarn wound thereon.

As will be understood, packages of textile material are usually dyed by passing a treating fluid therethrough. If the yarn in the various packages was not uniformly wound thereon and the yarn packages are therefore not of substantially uniform density or relative permeability, the yarn in the various packages will not be uniformly treated. Thus, during a dyeing operation, the yarn on the various packages, when subjected to the same fluid treatment, may differ in color.

It has previously been proposed to provide an apparatus for testing the relative permeability of yarn packages prior to fluid treatment by passing a pressurized testing fluid through the core of the package and measuring the pressure loss due to leakage of the pressurized fluid through the yarn. However, in that proposed apparatus, it was necesary for the operator to manually mount the yarn package in the pressurized fluid testing apparatus, to visually observe scale readings to determine the relative permeability of the yarn, and then to manually remove the yarn package from the testing apparatus and manually deposit the package in one of a plurality of groups depending on the degree of permeability as indicated by the pressure readings. As will be evident, such a proposed arrangement is not suitable for present day mass production requirements due to the various manual operations involved. Additionally, the operators may make errors in reading the pressure gauge which would lead to undesirable conditions in the final products, as will be understood.

Accordingly, it is an important object of the present invention to provide for automatically measuring or testing the density of yarn in a yarn package. A further and related object is to provide for automatically sorting or separating yarn packages into a plurality of groups, depending on the densities thereof, as determined by the testing apparatus.

A more specific object of the invention resides in the provision of a novel apparatus and method for automatically conveying yarn packages to a testing station where the density of the yarn is automatically measured, and for automatically delivering the packages from the testing station to any of a plurality of receiving stations or receptacles according to the density of the yarn as determined at the testing station.

According to the invention, there is provided an apparatus including a testing station with a conveying means or yarn carrier being provided to intermittently feed yarn packages thereto. The testing means provided at the testing station is designed to pass a pressurized fluid through the yarn package, and the yarn carrier is designed to feed yarn packages to the testing station in timed sequence to the operation of the testing means, so that the yarn packages will be in position to be automatically and properly engaged by the testing means when the latter is actuated. The yarn carrier is also operable to deliver yarn packages from the testing station, after they have been tested, and to a discharge area. Thus, during normal operation, as a yarn package is fed to the testing station, the yarn package which had previously been tested at the testing station is delivered therefrom to the discharge area. At the discharge area, a sorting mechanism is provided for directing the yarn packages—delivered thereto by the yarn carrier from the testing station—to one of a plurality of receiving stations or receptacles. The sorting mechanism is operatively connected to the testing means to provide for direction of the yarn packages to the proper receiving point or receptacle in accordance with the density of the package, as determined at the testing station. In the illustrative embodiment of the invention to be described in more detail hereinbelow, there are provided three receiving stations, one for soft, one for medium, and one for hard packages. The medium and soft tubes are sent to the yarn dyeing department. The soft tubes are dyed in a separate lot from the medium tubes, while the tubes which are too firm preferably are taken back to the winders and are rewound.

Thus, the density is checked on a fully automatic basis and in an actual practical embodiment of the invention, the apparatus is capable of handling thirty-five yarn packages per minute.

The yarn packages with which the invention is particularly applicable include a perforated or fluid pervious tubular core on which the yarn is wound by any suitable machinery. The testing means engages the ends of the tubes and passes pressurized fluid therethrough.

In the illustrative embodiment of the invention to be described in more detail hereinbelow, there is also provided a tube crimping station immediately prior to or "upstream" from the testing station. The yarn carrier intermittently feeds the yarn packages to the crimping station, and a crimping mechanism at the crimping station is actuated in timed relation to the operation of the yarn carrier to automatically engage the ends of the tubes of the yarn packages and crimp the same when the yarn packages are at the crimping station.

Further objects and advantages of the invention will be in part obvious and in part pointed out hereinafter.

The novel features of the invention may be best made clear from the following description and accompanying drawings in which:

FIGURE 4 is a fragmentary top-plan view of the yarn carrier and tracks in the apparatus of FIGURE 1, and with certain structure omitted for clarity and convenience of illustration, as will be understood;

FIGURE 5 is a partially vertically sectioned and partially diagrammatic view of one of the crimping cups at the crimping station and an exemplary structure for reciprocating same;

FIGURE 6 is a perspective view showing an exemplary arrangement for reciprocating the yarn carrier horizontally and vertically, and for reciprocating the crimping cups at the crimping station and the nozzles at the density testing station;

FIGURE 7 is a diagrammatic illustration of an exemplary fluid control arrangement operatively associated with the density testing station; and FIGURE 8 is a wiring diagram of an exemplary electrical circuit arrangement that may be used in the automatic control system for the apparatus of FIGURE 1.

Figure 1:
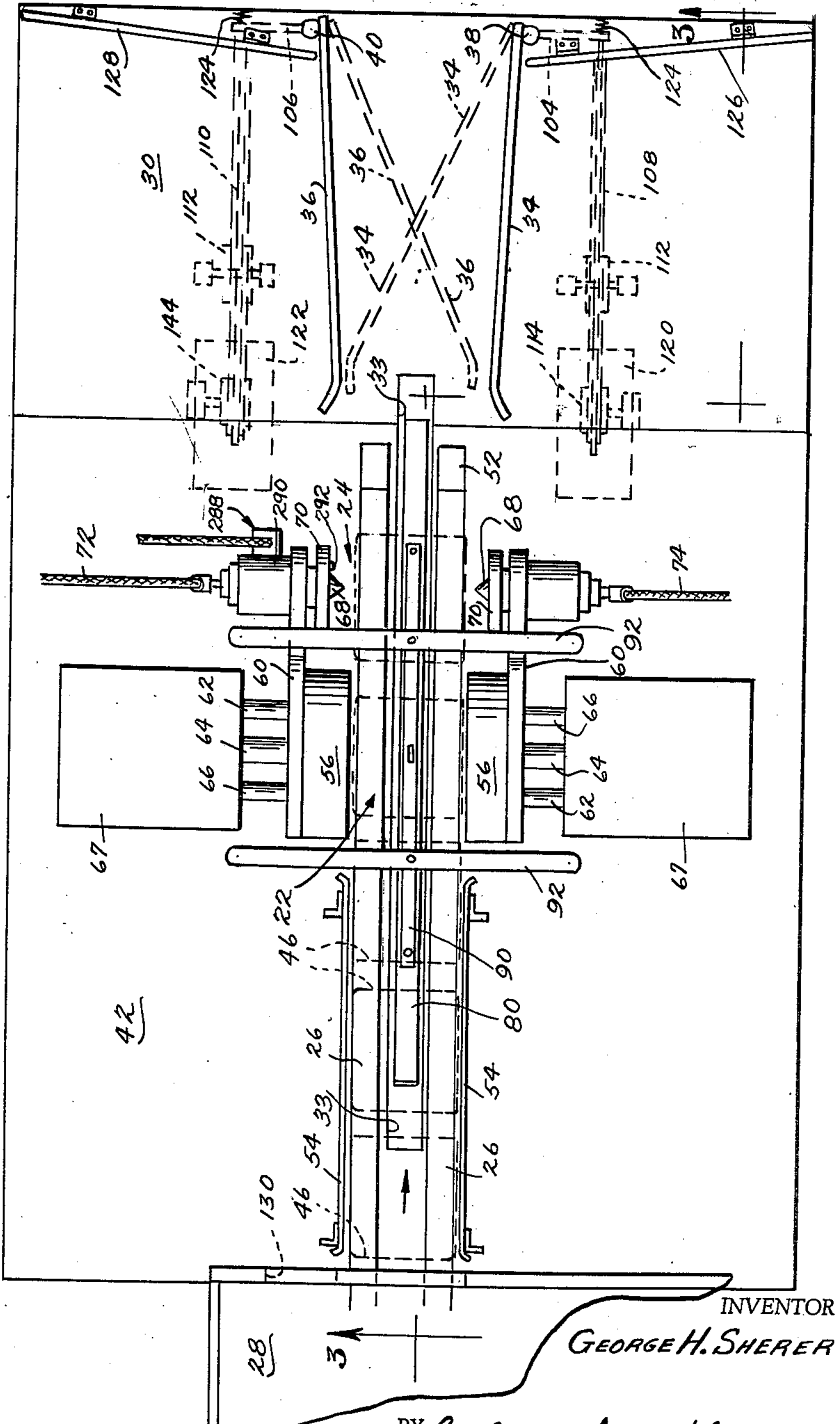
FIGURE 1 is a plan view of an apparatus embodying the invention.
Figure 2:
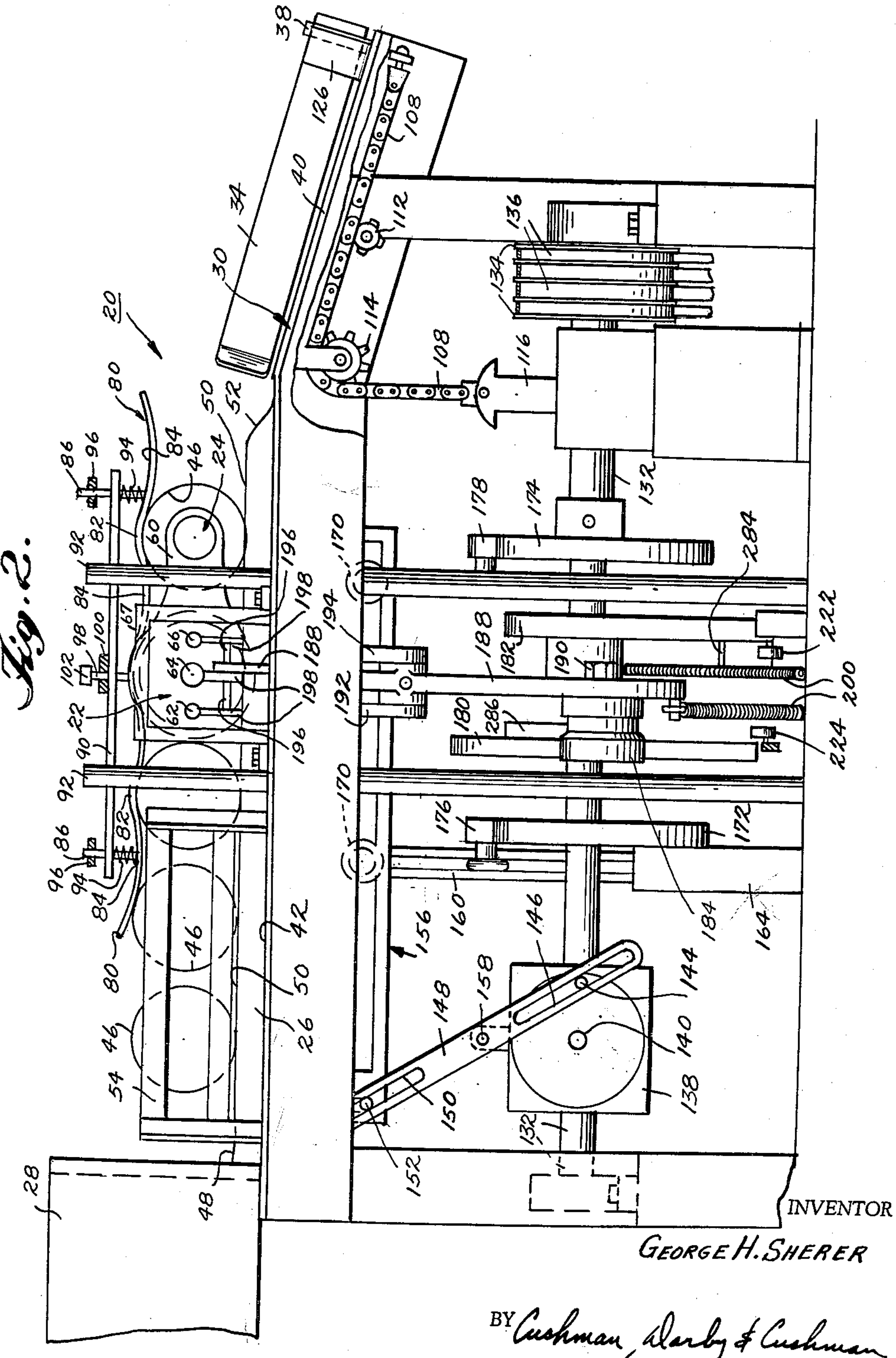
FIGURE 2 is a side elevational view of the apparatus shown in FIGURE 1.
Figure 3:
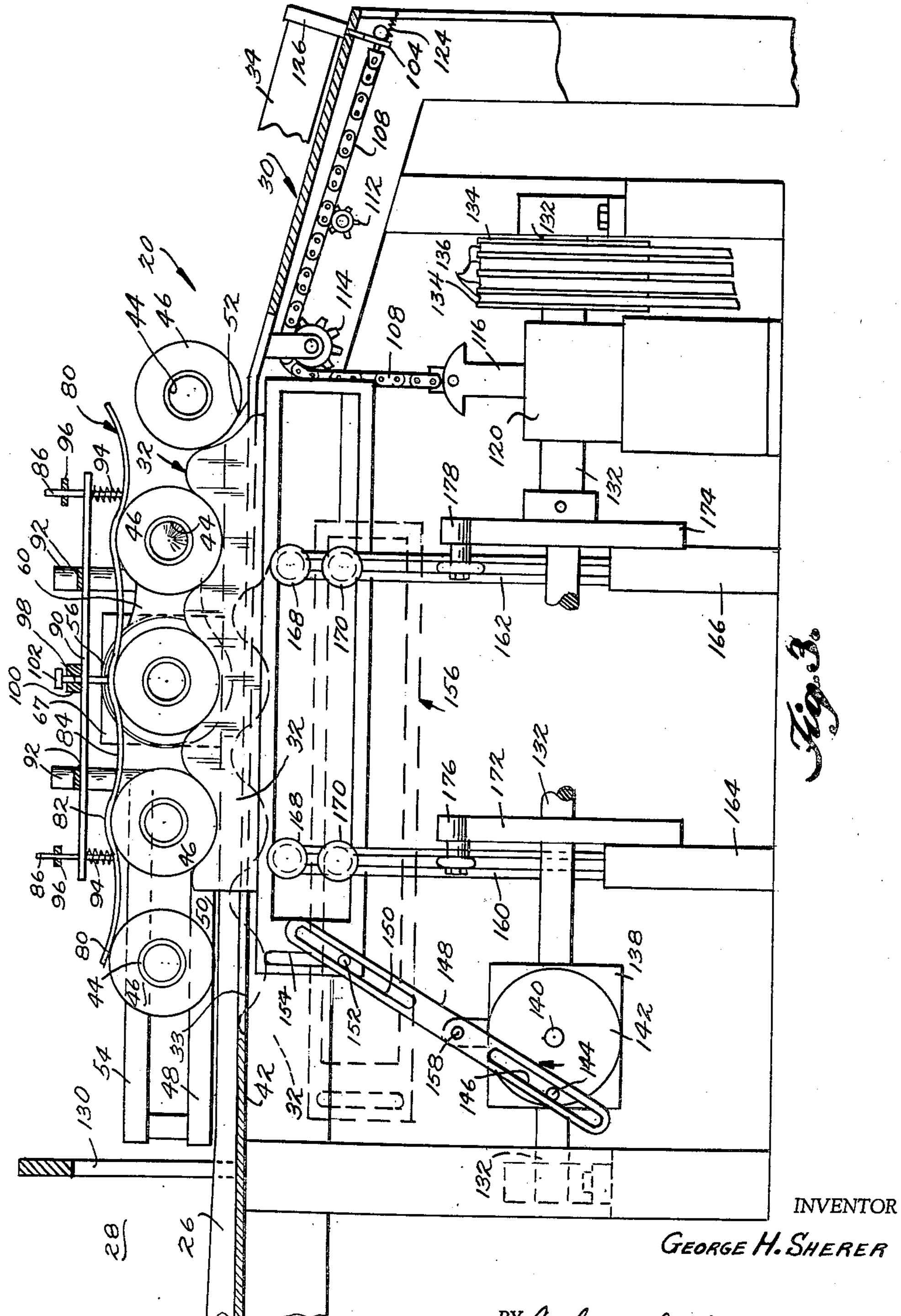
FIGURE 3 is a partially vertically sectioned side elevational view of FIGURE 1, taken along line 3—3 of FIGURE 1, and with certain parts omitted for clarity of illustration.

Referring to the illustrative embodiment of the invention shown in the drawings, there is provided a bench or frame 20 on which are arranged a crimping station 22 and a density testing station 24 for the yarn packages, as indicated in FIGURES 1, 2 and 3. These two stations 22, 24 are in alignment with each other, and a pair of tracks 26 extend forwardly from a scray or hopper 28 at the rear of the bench through the stations 22, 24. A discharge area 30 is provided at the front of the bench 20 (the right hand end of the testing station 24, as indicated in FIGURES 1, 2 and 3).

As will be explained in more detail hereinafter, a yarn carrier 32 is arranged between the tracks 26 in an opening 33 in bench top 42 and is adapted to intermittently feed yarn packages, on their sides, to the crimping station 22 and the density testing station 24. The yarn carrier is also operable to intermittently discharge the yarn packages from the testing station 24 to the discharge area 30 where each of the packages is selectively directed to one of three receiving stations or receptacles. Two guide bars 34, 36 are arranged in the discharge area 30 for directing the yarn packages to the desired receptacle. Each of the guide bars 34, 36 is mounted on a rotatable pin or shaft 38, 40, respectively, whereby these bars are pivotably or swingable about the axis of their respective shafts. The guide bars 34, 36 are normally in the solid line position thereof shown in FIGURE 1 whereby they define a passageway for the yarn packages from the testing station 24 to a receptacle or crate (not shown) at the front of the bench 20 for yarn packages of a standard density. The guide bars 34, 36 when individually actuated to their dotted line positions, shown in FIGURE 1, will direct yarn packages leaving the testing station 24 to receptacles or crates (not shown) respectively on the left and right sides of the bench 20 for yarn packages of low density or high density, respectively.

As shown, the hopper 28, the crimping station 22, the density testing station 24 and the discharge area 30 are all arranged on the top 42 of the bench 20, the top 42 being level for the hopper 28, crimping station 22 and testing station 24, and inclining downwardly away from the testing station 24 to define the discharge area 30.

The yarn packages are of conventional form including a perforated or fluid-pervious tubular core 44, on which the yarn 46 is wound. The yarn may be wound on the core in any conventional manner, and the tubular core 44 is shown as projecting outwardly from the bundle of yarn, at either end thereof.

The tracks 26, as best seen in FIGURES 1–4, are arranged on the top 42 of the bench, and include a downwardly inclined rear portion 48 disposed adjacent the hopper 28, a level or flat portion 50 extending from the inclined portion 48 through the crimping 22 and density testing 24 stations to a downwardly inclined forward portion 52 terminating adjacent the discharge area 30. These latter inclined portions 52 are disposed between the upper ends of the guide bars 34, 36, when the latter are in their normal, unactuated positions. The yarn packages will roll over the inclined track portions 52 and into the discharge area after leaving the testing station 24, as will be aparent.

Rails 54 are shown extending from the hopper 28 to adjacent the crimping station 22, and on opposite sides of the tracks 26, to hold the yarn packages in position to be fed through the apparatus.

The crimping station operative to eliminate the hard edges for obtaining proper flow of dye, liquor, is defined by a pair of crimping cups 56 disposed on opposite sides of the tracks 26, and in facing relation. Means are provided for reciprocating these cups 56 toward and away from each other so that the recess 58 in the central portion of each cup may be brought into engagement with the ends of the tubes of the yarn packages for crimping same. These means are shown as including an arm 60 attached to each cup 56, and carried by three shafts 62, 64, 66. The shafts are reciprocably arranged in a stationary block 67 mounted on the bench top 20, as best seen in FIGURES 1, 2 and 5. Thus, reciprocation of these shafts will effect reciprocation of the crimping cups 56 toward or away from each other. The structure for reciprocating these shafts in timed relation to the feeding movements of the yarn carrier 32 will be described hereinbelow.

The arms 60 extend laterally and forwardly from the crimping cups 56 and a nozzle 68 is carried by these arms, at the free ends thereof, to define the density testing station. A disc-like yarn tube engaging member 70 is arranged on each of the arms 60, and the nozzles 68 extend therethrough, as shown. The nozzle 68 on the left hand side of the apparatus (the right hand side as shown in FIGURE 7) is connected through a flexible tubing 72 to a suitable source of pressurized fluid, such as air, and a similar flexible tubing 74 is connected in communication with the other or opposite nozzle 68 and will deliver pressurized fluid to a pressure operated control arrangement, as will be explained in more detail hereinafter.

It will be seen that nozzles 68 will be reciprocated simultaneously with the crimping cups 56, due to connection to their common arms 60.

The yarn carrier 32, as best seen in FIGURES 3 and 6, includes a plurality of peaks 76 and valleys 78 designed to receive the yarn packages. As will be described in more detail hereinbelow, means are provided for reciprocating the yarn carrier in a horizontal direction, and for moving the yarn carrier downwardly away from the yarn packages, and then upwardly back into engagement with yarn packages, in timed sequence to the actuation of the arms 60, so that yarn packages will be intermittently fed one at a time to the crimping and testing stations, where they will be engaged by the crimping cups 56 and members 70. After crimping and density testing operations have been performed, the yarn carrier 32 will then move the yarn packages a distance corresponding to the distance between the crimping station 22 and the density testing station 24 in order for the yarn package that was at the crimping station to be moved to the testing station, while the package that was at the testing station is being delivered to the discharge area 30, and while a new package is being disposed at the crimping station.

A spring urged package retainer 80 is shown as being arranged above the carrier 32 for engagement to the yarn packages, and for retaining them in proper position to be engaged by the crimping cups 56 and the nozzles 68, yet permitting the packages to be moved during feeding movements of the yarn carrier 32. This retainer 80 is shown as being made of flat strip material including peaks 82 and valleys 84. The structure for mounting retainer 80 is shown as including a pair of rods 86 extending from the retainer through a bar 90 mounted thereabove by a pair of inverted U-shaped frames 92 secured to the bench top 42, on either side of the blocks 67. A compression spring 94 is arranged around each of these rods 86, and a lug 96 is carried by each rod 86 for limiting the downward movement of the retainer 80 under the action of these springs. A centering or guiding pin 98 is shown extending from about the midpoint of the retainer 80 upwardly through a guide sleeve 100 on the bar 90. This pin provides for smooth vertical movements of the retainer 80 when yarn packages are being fed thereunder. A lug 102 is shown as being carried by the pin 98 above guide sleeve 100.

The shafts 38, 40 for the guide bars 34, 36 are journalled in the bench top 42, and extend therethrough for engagement to levers 104, 106, respectively, as best seen in FIGURES 1, 2 and 3. The levers 104, 106 are in turn connected to chains 108, 110, respectively, which are trained around sprocket wheels 112, 114 suitably mounted for rotation about fixed axes below the top 42. The opposite ends of the chains 108, 110 are connected to the upper ends of rods 116, 118 defining armatures of solenoid actuators 120, 122, respectively. Springs 124 are shown as being engaged to the ends of the levers 104, 106 to normally dispose the guide bars 34, 36 in the solid line positions thereof shown in FIGURE 1. The solenoids 120, 122 will be actuated by the control arrangement, to be described in more detail hereinafter, depending on the density of the yarn in the yarn package as determined at the density testing station.

Stationary guide bars 126, 128 are mounted on the bench top 42 in the discharge area 30 adjacent the lower ends of the guide bars 34, 36, for cooperation therewith to direct the yarn package leaving the testing station 24 to the receptacle at the right or left side of the bench 20.

In normal operation, the operator will empty a box (not shown) of yarn packages or dye tubes into the scray or hopper 28. The operator will then feed one tube at a time down the inclined portion 48 of the tracks 26 onto the yarn carrier 32. The tubes or packages will be disposed on their sides, and may be fed by the operator to the yarn carrier through an opening 130 in the hopper and through the region defined by the rails 54 and the tracks 26. The packages are picked up by the carrier 32 and are taken one at a time to the crimping station 22 and density testing station 24. The carrier is then lowered and moved to the rear for the next package. The package that was in the crimping station is then moved to the density testing station on the next forward stroke of the yarn carrier 32. At this point, the density of the yarn package is tested and if the yarn is too firm or too soft, one of the levers 104, 106 is actuated by its respective solenoid actuator 120, 122 to move its respective guide bar 34 or 36 to the dotted line position thereof shown in FIGURE 1 whereby the yarn package may be guided either to the soft or firm receptacles or crates positioned at each side of the machine. If the yarn on the yarn package falls into the medium or standard range of density, the tube will roll down the middle slot of the discharge area 30 through the space defined between the guide bars 34, 36 when they are in the solid line positions thereof, shown in FIGURE 1. Those packages will be collected in the box or crate at the front of the machine.

An exemplary structure for actuating the yarn carrier 32 is best seen in FIGURES 2, 3 and 6, and includes a main shaft 132 suitably mounted in stationary position beneath the bench top 42 and drivingly connected at its rear or right hand end through pulleys 134 and belts 136 to any suitable source of power. At the left or front end thereof, the shaft 132 is shown as extending into a gear box 138, and suitable gearing (not shown) will be provided in the gear box 138 to effect a 90° change in direction of the rotation to a take-off shaft 140 journalled in and extending out from the side of the gear box 138, as shown. A driving wheel 142 is fixed to the shaft 140, and a driving pin 144 extends therefrom through an elongated slot 146 of a driving of stroke lever 148. The upper end of the lever 148 is shown as being slotted at 150 and in driving engagement with a lug 152 attached to and projecting outwardly from a vertical elongated slot 154 in a rectangular frame 156 mounting the yarn carrier 32. Lug 152 is vertically slidable in the slot 154, and the lever 148 is pivotable about a fixed pivot point 158, whereby rotation of the wheel 142 will effect oscillation of the lever 148 to move its upper end from its extreme left hand or rear position to its extreme right hand or forward position and then back to its extreme left hand position for every complete revolution of the wheel 142. The gearing in the gear box 138 preferably is such that the shafts 132, 140 will rotate at the same speed or velocity.

The structure for moving the yarn carrier 32 up and down is shown in FIGURES 2, 3 and 6 as including a pair of vertical bars 160, 162 mounted for vertical reciprocating movement in vertical sleeves 164, 166, respectively, secured to the lower portion of the bench 20. An upper 168 and a lower 170 roller are arranged on each of these bars 160, 162 and are in rolling engagement with the frame 156. These rollers preferably are provided with a peripheral groove therein arranged to receive the frame 156, as best seen in FIGURE 6, whereby the frame 156 carrying the yarn carrier 32 will be reciprocable horizontally over these rollers. The bars 160, 162 are shown as being vertically reciprocated by a pair of identical or substantially identical cams 172, 174 fixed to the main shaft 132 in alignment with each other and positioned to actuate cam followers or rollers 176, 178 fixedly connected to and extending from the bars 160, 162, as best seen in FIGURE 6. The profiles of the cams 172, 174 will be such that the yarn carrier will be in its up position in driving engagement with the yarn packages during feeding movements of the yarn carrier 32 toward the front of the apparatus (toward the right as viewed in FIGURES 2, 3 and 6), while permitting the yarn carrier to be moved downwardly out of engagement with the yarn packages when it is being moved to the rear (the left as viewed in FIGURES 2, 3 and 6). The weight of the yarn carrier 32, frame 156 and bars 160, 162 may be utilized for continuously urging the yarn carrier downwardly, or, if desired, suitable springs may also be utilized or this purpose.

The lug 152 and its slidable connections to the slot 154 in the yarn carrier frame 156 and the slot 150 in the upper end of lever 148 will permit oscillation of the stroke lever 148 to effect horizontal reciprocation of the yarn carrier frame 156, while permitting the carrier frame to move up and down in response to rotation of the cams 172, 174, as will be evident.

An exemplary structure for reciprocating the arms 60, carrying the crimping cups 56 and nozzles 68 will now be described, referring to FIGURES 2, 5 and 6. Two other cams 180, 182 are fixed in spaced relation on the shaft 132 between the cams 172, 174. The profiles of these cams 180, 182 are shown in being identical or substantially identical, but they are arranged on the shaft 132 180° out of phase with each other, as is best seen in FIGURES 2 and 6.

Identical or substantially identical structures will be utilized for operatively connecting each of the cams 180, 182 to the shafts 62, 64, 66 for the arms 60, hence only one of these structures will be described, it being understood that the other structure will be similarly associated with the other of these cams on the other side of shaft 132.

A follower in the form of a roller 184 is shown engaged to the cam 180 and journalled on a pin 186 carried by the lower end of a lever 188. The lever 188 is pivotally mounted on a fixed pivot pin 190 mounted in lugs 192, 194 depending from the bench top 42, and the upper end of the lever 188 is slotted and receives a pin 196 drivingly connected to a lug 198 fixed to the shaft 64 and also to other lugs similarly attached to the shafts 62, 66. Thus, pivotal movement of the lever 188 in a clockwise direction about the pin 190, as viewed in FIGURE 5, will effect movement of the arm 60 to the right, as viewed in FIGURE 5, while pivotal movement of the lever 188 in a counterclockwise direction will effect a return movement of the arm 60 to the left. A tension spring 200 is connected at one end to the lower portion of the bench 20 and at the other end to the lower end of the lever 188 for continuously urging the cam follower 184 into engagement with the cam 180. Thus, the spring 200 will continuously urge the lever 188 to pivot a counterclockwise direction, as viewed in FIGURE 5

As previously stated, the cams 180, 182 are arranged so as to be 180° out of phase with each other, and the cam followers 184 in engagement therewith will be disposed at substantially the same level but on opposite sides of the shaft 132, as indicated in FIGURE 6.

Thus, during rotation of the shaft 132, the crimping cups 56, nozzles 68 and yarn package engaging discs 70 will be moved by the cams 180, 182 and levers 188 into engagement with yarn packages after they have been moved into position in the crimping and density testing stations by the yarn carrier 32. The high side of the cams 180, 182 will actuate the cam followers 184 and levers 188 to move the crimping cups and nozzles into their yarn package engaging positions and keep them in that position for crimping and density testing operations while the yarn carrier 32 is being moved (1) down due to the profiles on the cams 172, 174 and (2) to the rear or left by the rotation of pin 144 and pivoting of lever 148. When the yarn carrier 32 is all the way to the left or rear, the crimping cups 56 and nozzles 68 will have been released from engagement with the yarn packages at the crimping and density testing stations, and the high sides of the cams 172, 174 will elevate the yarn carrier 32 into engagement with the yarn packages so that on the forward stroke of the yarn carrier, the yarn packages will be engaged by the peaks and valleys of the yarn carrier and moved a distance corresponding to the space between the crimping and testing stations whereby a new package will be brought into the crimping station, the package that was in the crimping station will be moved to the density testing station, and the package that was at the testing station will be dropped into the discharge area. After such feeding movement is completed, the profiles of the cams 172, 174 will permit the yarn carrier to again be moved downwardly while the high sides of the cams 180, 182 will again actuate the levers 188 to move the crimping cups 56 and nozzles 68 into engagement with the yarn packages at their stations to begin a new cycle.

In the illustrative embodiment of the invention, the control arrangement for effecting actuation of the guide bars 34, 36 in the event the density of the yarn package being tested is above or below the standard or normal range, is shown in FIGURE 7 as including the line or tubing 74 leading from the receiving nozzle 68, on the left hand side of the machine, to two static pressure regulators 202, 204, shown schematically in FIGURE 7. These regulators 202, 204 may be of any conventional construction respectively having air pressure inlet lines 206, 208 connected to the one side thereof, and also respectively having outlet lines 210, 212 leading therefrom to low differential pressure control switches 214, 216, respectively. These pressure control switches are of standard construction, and switch 214 is for the soft or low density yarn packages, while switch 216 is for the hard or high density yarn packages. These switches 214, 216 are arranged in an electrical control circuit as will be explained in detail hereinbelow.

The pressure regulators 202, 204 are set so that: if the pressure received in the line 74, during a testing operation, is in the normal or standard pressure range, or higher, pressurized air will pass through the line 210 leading from regulator 202 to the pressure switch 214 connected therewith to actuate the latter; if the pressure in the line 74, during a testing operation, is high indicating that the density of the yarn in the package being tested is above the standard or normal range, the pressure regulators 204 will be operated to convey pressurized air through the line 212 connected to the pressure switch 216; if the density of the yarn in the package being tested is in the normal or standard pressure range, for example, 1–4 inches of water, switch 216 will not be actuated, but switch 214 will be actuated, as stated; and if the density of the yarn in the package being tested is below the normal range, switches 214, 216 will not be actuated. The purpose of these functions will be apparent from the following description of the electrical circuitry.

An exemplary electrical circuit for the control arrangement is shown in FIGURE 8. The pressure switch 214 for the soft or low density yarn packages is shown in FIGURE 8 as being normally closed, and it will be opened if the pressure of air in the line 74 is in the normal range or higher, indicating normal yarn density or high yarn density. If the pressure in line 74 is low, indicating low yarn density, switch 214 will remain closed.

The pressure switch 216 for the hard or high density side is shown in FIGURE 8 as being normally open, and will be closed only when the pressure in line 74 is high or above the normal range.

Power lines 218, 220 provide the electrical energy for the circuit, and a normally open switch 222 and a normally closed switch 224 are provided in a conductor 226 extending from a connection 228 in the line 218 through the switches 222, 224, 214 and to a terminal 230 of a normally opened switch 232. The other terminal 234 of switch 232 is connected through lead line 236 to the conductor 226.

Another line 238 extends from terminal 230 to a hold-in or holding coil 240 which connects through a terminal 242 of a switch 244 to the other power line 220. An armature 246 is arranged to be actuated by energization of the coil 240 and switches 232, 244 as well as a third switch 248 are carried by the armature-actuator 246. These three switches 232, 244, 248 are normally held in and urged to open position and when the coil 240 is energized to actuate or move the armature 246 to the right, these switches will be closed. Closing of switches 232, 244, 248 will provide power from the lines 218, 220 though lines 250, 252 and through the solenoid 120 for the armature 116 which controls the soft or low density guide bar 34.

The pressure switch 216 for the hard or high density yarn packages is arranged in a line 254 branching from the conductor 226 to a terminal 256 of a normally open switch 258. The other terminal 260 of this switch 258 is connected by line 262 to the terminal 234 of switch 232, while another line 264 leads from the terminal 256 through a hold-in or holding coil 266 which is connected to the power line 220 through a terminal 268 of a normally open switch 270. Switches 258, 270 are carried on a common armature 272 which also carries a third normally open switch 274. The armature 272 is arranged to be actuated by the coil 266, and will be normally biased to the position thereof shown in the drawing. Switches 270, 274 connect through leads 276, 278 to the power lines 220, 218, respectively, and the lead wires 280, 282 for the solenoid 122 connect to the other terminals for these switches. The solenoid 122 actuates the armature 118 and guide bar 36 for the hard or high density yarn packages. Thus, when the hold-in coil 266 is energized to close the switches 258, 270, 274, the solenoid 122 will be energized to actuate the guide bar 36.

The normally open switch 222 is shown in FIGURE 6, and is positioned to be actuated by a projection 284 on the cam 172. This switch will be actuated while the density testing operation is being performed, and after a sufficient time has gone by for either or both of the pressure switches 214, 216 to have been actuated in the event the density of the yarn package in question is normal or too high. Thus, if the density is too low, the switch 214 will remain closed while the switch 216 remains open, and the closing of switch 222 will provide for a flow of current through the hold-in coil 240 to close the switches 232, 244, 248 and energize the solenoid 120 to actuate the low density guide bar 34. After the cam projection 284 rides off the switch 222, and this switch returns to its normally open position, the hold-in coil 240 remains energized through the circuit including the power line 218, the normally closed switch 224, the lead line 236, switch 232, and lead lines 238, 252 going to the other power line 220. The hold-in coil 240 remains so energized to keep the solenoid 120 energized, and the low density guide bar 34 in its actuated position until after the crimping cups 56 and pressure nozzles 68 have been retracted from the yarn packages and the yarn carrier 32 has been reengaged to the yarn packages and begun its next feeding movement, whereby the yarn package which had been at the testing station will be moved to the sloping portion 52 at the forward end of the tracks to roll down the discharge area 30 and be directed by the actuated guide bar 34 and guide bar 126 to the low density receptacle. At this time, a projection 286 on the cam 180 for the switch 224 will actuate this switch and open same whereby the circuit through the hold-in coil 240 will be broken and switches 22, 244, 248 returned to their normally open positions. This will permit the guide bar 34 to be returned to its normal or solid line position in FIGURE 1, by the spring 124.

If the density of the yarn in the package being tested is too high, the switch 216 will be closed while the switch 214 will be opened, and the closing of switch 216 coupled with the closing of the switch 222 by the action of the cam projection 284 will provide for a flow of current through the hold-in coil 266 to close the switches 258, 270, 274 and energize the solenoid 122 to actuate the high density guide bar 36. After the cam projection 284 rides off the switch 222, and this switch returns to its normally open position, the hold-in coil 266 remains energized through the circuit including the power line 218, the normally closed switch 224, the lead line 236, the lead line 262, the closed switch 258, the lead line 264, and the lead line 276 going to the other power line 220. The hold-in coil 266 remains so energized to keep the solenoid 122 energized, and the high density guide bar 36 in its actuated position until after the crimping cups 56 and pressure nozzles 68 are retracted from the yarn packages and the yarn carrier 32 has been reengaged to the yarn packages and begun its next feeding movement, whereby the yarn package which had been at the testing station will be moved to the sloping portion 52 at the forward end of the tracks 26 to roll down the discharge area 30 and be directed by the actuated guide bar 36 and guide bar 128 to the high density receptacle. At this time, the projection 286 on the cam 180 for the switch 224 will actuate this switch and open same whereby the circuit through the hold-in coil 266 will be broken and switches 258, 270, 274 returned to their normally open positions. This will permit the guide bar 36 to be returned to its normal or solid line position in FIGURE 1, by the spring 124.

It will be understood that as soon as the projection 286 rides off the switch 224, this switch will return to its normally closed position. Likewise, when the projection 284 rides off the switch 222, this switch will be returned to its normally open position.

If the density of the yarn on the package being tested is in the normal or standard range, the pressure switch 216 will remain open, and the normally closed pressure switch 214 will be opened whereby neither of the solenoids 120, 122 will be energized when the switch 222 is closed, and the guide bars 34, 36 will remain in the normal or solid line positions thereof shown in FIGURE 1 to direct yarn packages leaving the testing station 24 to the receptacle disposed at the front of the machine.

A microswitch 288 is shown in FIGURE 1 as being carried by the tubular structure 290 mounting the nozzle 68 on the right hand side of the machine, and this microswitch is shown in FIGURE 8 as being arranged in the power line 218. This switch 288 is normally open, and a movable actuator 292 is provided therefor on the disc 70 whereby the microswitch 288 will be closed only if a yarn package is disposed in the testing station 24. The actuator 292 will be disposed in the position to be engaged by the tubular core 44 of a yarn package disposed at the testing station 24 when the nozzles 68 are reciprocated toward each other. Thus, this switch 288 will prevent the flow of power in the control circuit when a yarn package is not in the testing station, thereby preventing the mechanism from being activated as a result of low pressure.

Although not shown, it will be appreciated that suitable control means may be provided to prevent the flow of pressurized air through the line 72 and nozzle 68, except when the nozzles 68 are moved to and in their density testing positions. And, if desired, some other suitable fluid, besides air, may be utilized as the pressurized testing fluid for the nozzles 68.

The present invention will thus be seen to completely and effectively accomplish the objects enumerated hereinabove. It will be realized, however, that various changes and substitutions may be made to the specific embodiments disclosed herein for the purpose of illustrating the principles of this invention, without departing from these principles. Therefore, this invention includes all modifications encompassed within the spirit and scope of the following claims.

What is claimed is:

1. In a method for determining the density of yarn packages including yarn wound on a hollow, fluid-pervious core, the steps comprising: conveying said packages one at a time to a crimping station; mechanically crimping the ends of the core of each package at said crimping station to eliminate the hard edges for obtaining proper flow of dye liquor; conveying said packages from said crimping station to a testing station; and testing the density of the yarn on each package while at said testing station.

2. The method defined in claim 1 wherein said packages are automatically conveyed from said testing station to any of a plurality of receiving stations depending on the density of the yarn on said packages as determined at said testing station.

3. The method defined in claim 1 wherein the density of the yarn on the packages is determined at said testing station by passing a pressurized fluid through the core of each package and measuring the loss in pressure of said fluid due to the permeability of the yarn wound thereon.

4. In an apparatus of the character described, the structure including: a testing station; means for disposing a yarn package having yarn wound on a hollow fluid pervious core at said testing station; means arranged at said testing station for testing the density of the yarn on said package including means for passing a pressurized fluid through the core of each package and measuring the loss in pressure of said fluid due to the permeability of the yarn wound thereon; three receiving stations; and means for automatically conveying said package from said testing station to one of said receiving stations depending on the density of the yarn on said package and means for guiding said yarn packages below an acceptable density to one receiving station, yarn packages within an acceptable density to another receiving station, and yarn packages with an excessive density to the remaining receiving station.

5. Apparatus for determining the density of yarn packages, comprising: a crimping station; a testing station; conveying means for mechanically delivering yarn packages to said crimping station and said testing station; means operative at said crimping station for crimping the ends of said packages to eliminate hard edges whereby proper flow of dye liquor is obtained; and means arranged at said testing station for determining the density of the yarn on said packages.

6. Apparatus for automatically sorting yarn packages based on the density of the yarn in said packages, said apparatus including: a testing station and three receiving stations spaced therefrom; conveying means for delivering yarn packages one at a time to said testing station; testing means arranged at said testing stations for determining the density of the yarn on said packages including means for passing a pressurized gas therethrough and measuring the resulting drop in pressure; said conveying means operating to deliver said packages from said testing station and toward said receiving stations; and means intermediate said testing station and said receiving stations and operatively connected to said testing means to direct each of said packages to one of said receiving stations in accordance with the density of the yarn on the packages as determined by said testing means wherein yarn packages having a predetermined density range are directed to the first receiving station, wherein packages having a greater density than said range are directed to said second receiving station and the yarn packages having a density less than said range are directed to said third receiving station.

7. Apparatus for sorting yarn packages according to the density of the yarn thereon wherein said yarn packages inlcude a fluid-pervious tube and yarn wound thereon with the tube projecting from both ends of the yarn, said apparatus comprising: a tube crimping station and a testing station; means for conveying yarn packages successively through said crimping station and said testing station; means at said crimping station engageable to the ends of the tubes of said packages for crimping said ends to eliminate the hard edges for obtaining proper flow of dye liquor; and means at said testing station for determining the density of the yarn wound on said package.

8. Apparatus for sorting yarn packages according to the density of the yarn thereon wherein said yarn packages includes a fluid-pervious tube and yarn wound thereon with the tube projecting from both ends of the yarn comprising: a crimping station, a testing station; conveying means for intermittently delivering yarn packages to said stations in succession, and testing means automatically operable in timed relation to the operation of said conveying means to engage a yarn package disposed at said testing station for determining the density of the yarn on said packages while at said testing station, including means for passing a pressurized fluid through the core of each package and measuring the loss in pressure of said fluid due to the permeability of the yarn wound thereon.

9. Apparatus for sorting yarn packages according to the density of the yarn thereon, said yarn packages including a fluid-pervious tube and yarn wound thereon with the tube projecting from the ends of the yarn comprising: a testing station; a crimping station disposed upstream of said testing station; conveying means for intermittently delivering said yarn packages to said crimping station and then to said testing station, said crimping station including means for crimping the ends of the tubes of said packages to eliminate the hard edges and obtaining a proper flow of dye liquor, said testing station including means for determining the density of the yarn on said package while at said testing station and including means for passing a pressurized fluid through the core of each package and measuring the loss in pressure of said fluid due to the permeability of the yarn wound thereon.

10. Apparatus as defined in claim 9 and further including: a plurality of receiving stations spaced from said testing station and also spaced from each other; and means for directing said yarn packages delivered from said testing station to one of said receiving stations and in accordance with the density of the yarn on each package as determined at said testing station.

11. Apparatus as defined in claim 10 wherein said conveying means feeds said packages one at a time through said crimping and receiving stations; and actuating means operatively connected to said crimping means and said testing means for actuating said crimping and testing means in between feeding movements of said conveying means.

12. The method defined in claim 2 wherein said tested yarn packages are conveyed to one of three receiving stations: the first station receiving yarn packages having an acceptable density, the second and third stations receiving yarn packages having an excessive and insufficient density, respectively.

13. Apparatus defined in claim 4 further including a crimping station, said disposing means operative to move said yarn package first to said crimping station and then to said testing station.

14. Apparatus defined in claim 6 wherein said intermediate directing means includes first and second guide bars, each of which are movable between two positions, said guide bars operative to assume one position wherein a yarn package passes therebetween to one receiving station, and said first and second guide bars are each movable to second positions wherein said yarn packages are deflected laterally oppositely of the path defined in said one position, to move a yarn package to one of said other two receiving stations.

References Cited in the file of this patent

UNITED STATES PATENTS

| | | |
|---|---|---|
| 2,932,391 | Broekhuysen | Apr. 12, 1960 |
| 2,951,364 | Sherrill | Sept. 6, 1960 |
| 2,952,262 | Pocock | Sept. 13, 1960 |